United States Patent [19]

Ossbahr

[11] 4,336,677
[45] Jun. 29, 1982

[54] ARRANGEMENT FOR PRESTRESSED ASSEMBLY OF MACHINE AND BASE-MODULES

[76] Inventor: Carl G. R. Ossbahr, Brahegatan 5 A S-722 16, Västerås, Sweden

[21] Appl. No.: 190,856
[22] PCT Filed: Jul. 19, 1979
[86] PCT No.: PCT/SE79/00160
§ 371 Date: Mar. 31, 1980
§ 102(e) Date: Mar. 27, 1980
[87] PCT Pub. No.: WO80/00322
PCT Pub. Date: Mar. 6, 1980

[30] Foreign Application Priority Data

Jul. 31, 1978 [SE] Sweden ............................ 7808285

[51] Int. Cl.³ .................................... E04C 1/10
[52] U.S. Cl. ........................... 52/584; 248/639; 248/678
[58] Field of Search .............. 52/584, 585; 248/678, 248/676, 639

[56] References Cited

U.S. PATENT DOCUMENTS

| | | | |
|---|---|---|---|
| 2,559,198 | 7/1951 | Ogden | 52/584 X |
| 2,813,439 | 11/1957 | Gracon | |
| 3,195,266 | 7/1965 | Onanian | 52/584 X |
| 3,390,502 | 7/1968 | Carroll | 52/585 X |

FOREIGN PATENT DOCUMENTS

| | | |
|---|---|---|
| 2038623 | 8/1971 | Fed. Rep. of Germany . |
| 2356343 | 5/1975 | Fed. Rep. of Germany . |
| 2623143 | 12/1977 | Fed. Rep. of Germany . |
| 144194 | 2/1954 | Sweden . |
| 184399 | 6/1963 | Sweden . |

*Primary Examiner*—Carl D. Friedman
*Attorney, Agent, or Firm*—Cushman, Darby & Cushman

[57] ABSTRACT

The invention relates to an arrangement for the prestressed assembly of machine- and base-modules offering extensive possibilities of combining modules in different positions. According to the invention jointing arrangements are achieved which satisfy the requirements of suitability for dismantling without at the same time greatly reducing the degree to which modules can be combined.

The modules according to the invention comprise a number of load-bearing devices each of which is designed with a circular conically concave abutment face, the apex of the cone being directed towards the module and the center axis of the cone at right angles towards the parting plane. If two modules are assembled with one another a gap is brought about between the conical abutment faces of the adjustment modules capable of accommodating a position-setting spacer element.

8 Claims, 9 Drawing Figures

ARRANGEMENT FOR PRESTRESSED ASSEMBLY OF MACHINE AND BASE-MODULES

The present invention relates to an arrangement for prestressed assembly of machine- and base-modules capable of attachment to and dismantling from one another in parting planes located at right angles or parallel to one another. More precisely, the parting planes are located in a cartesian (right angled, three-dimensional) system of co-ordinates in such a way as to be parallel to two of the axes while intersecting the third axis at points determined by a module length laid down for the system of co-ordinates. By way of explanation it may be said that with a uniformly constructed brick wall the parting planes between the bricks are located in this manner. The present arrangement for assembling modules is however not restricted to modules of uniform parallel-epipedic form. The distance between opposite parting planes of a module may vary by discrete steps corresponding to the said module length. Furthermore, module faces not used for assembly or assembled with another machine component according to a different principle may be of any form whatsoever. The problem solved or facilitated by the present invention consists, generally speaking, in being able to produce machines and machine systems in user-orientated designs, at acceptable costs, within short production times and in such a way as to permit conversion at a later date. This problem often arises when designing major industrial plant and systems, but also with minor machine systems such as special machine tools.

It has long been known that construction kits consisting of machine units and base components in the shape of modules meet the requirements for solving the said problem. However a number of more detailed conditions must also be satisfied.

It must be possible to combine the modules with one another in a number of different relative positions so as to enable variations in the structure of the end product to be achieved simply by assembling the modules in different ways. This makes it possible to construct different user-orientated product models using a minimum number of different modules. This enables long series of individual module types and, as a result, low manufacturing costs as well as storage of finished modules with a view to short end product fabrication times.

Furthermore, the modules must be capable of being dismantled in a simple way. This corresponds to the said requirement of convertibility at a future date.

In addition, the rule applies with mechanical constructions that a number of function-dependent conditions must be satisfied. As regards the jointing arrangements between the modules stringent requirements frequently apply inter alia in respect of strength, rigidity and accuracy.

The said arrangement of parting planes between modules, on which the present invention is based, offers considerable possibilities of combination in different positions. Apart from the said example of brick assemblies this is also illustrated by model construction kits for children such as Fischer Geometric. However, no known jointing arrangement has been shown to satisfy the requirements in respect of mechanical constructions and the requirement of suitability for dismantling without at the same time considerably reducing the degree to which units can be combined. For instance, flanged connections entail projecting flanges which make assembly in different angular positions more difficult or impossible. Stud connections and dovetail connections entail male and female sides, which also reduces the degree to which combinations are possible. With the arrangement designed for prestressed assembly of machine- and base-modules, laid out in accordance with the invention and characterised in the patent claims, these difficulties are avoided entirely.

Other characteristics and advantages of the present arrangement appear from the following specification of a number of embodiments of the said arrangement presented with reference to the attached drawings. In the different figures units which are identical or have identical functions are, wherever possible, identified by the same reference numbers.

Figure 1:
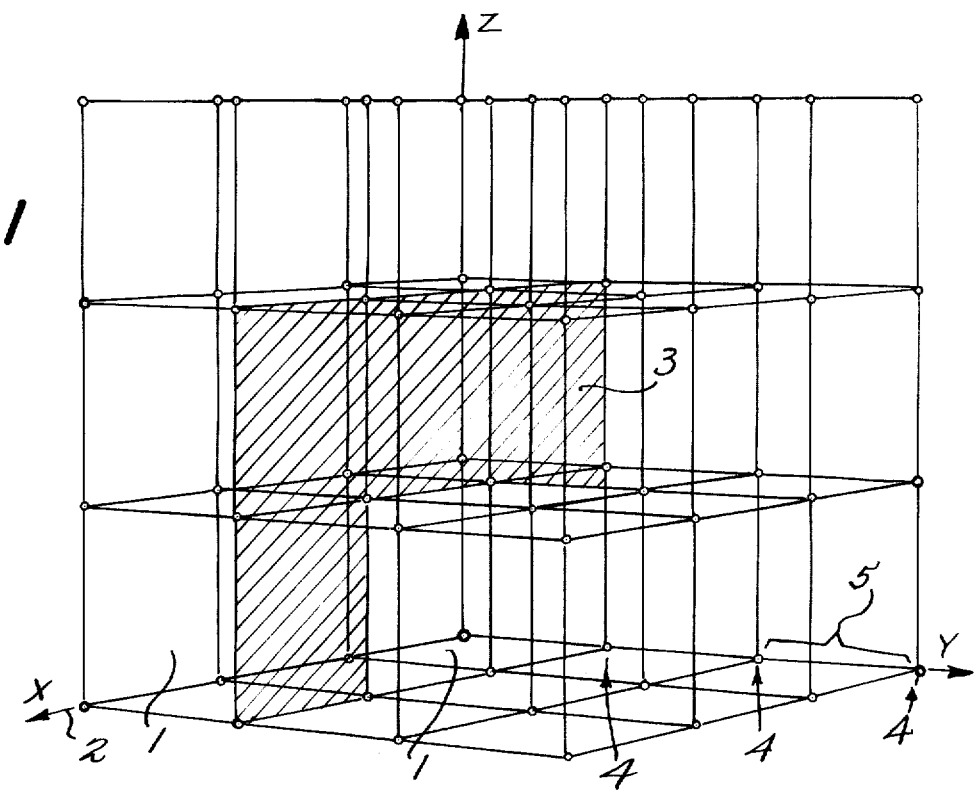
FIG. 1 shows in diagrammatic form two modules located in a system of co-ordinates which indicates possible positions of parting planes between modules.

In the drawings 1 designates machine or base modules. In FIG. 1 two such modules are shown in diagrammatic form and located within a cartesian system of co-ordinates 2. The module parting plane 3 coincides with planes in the co-ordinate system which are so arranged as to be parallel to two of the axes while intersecting points 4 along the third axis defining a module length 5 laid down in respect of the system of co-ordinates.

Figure 2:
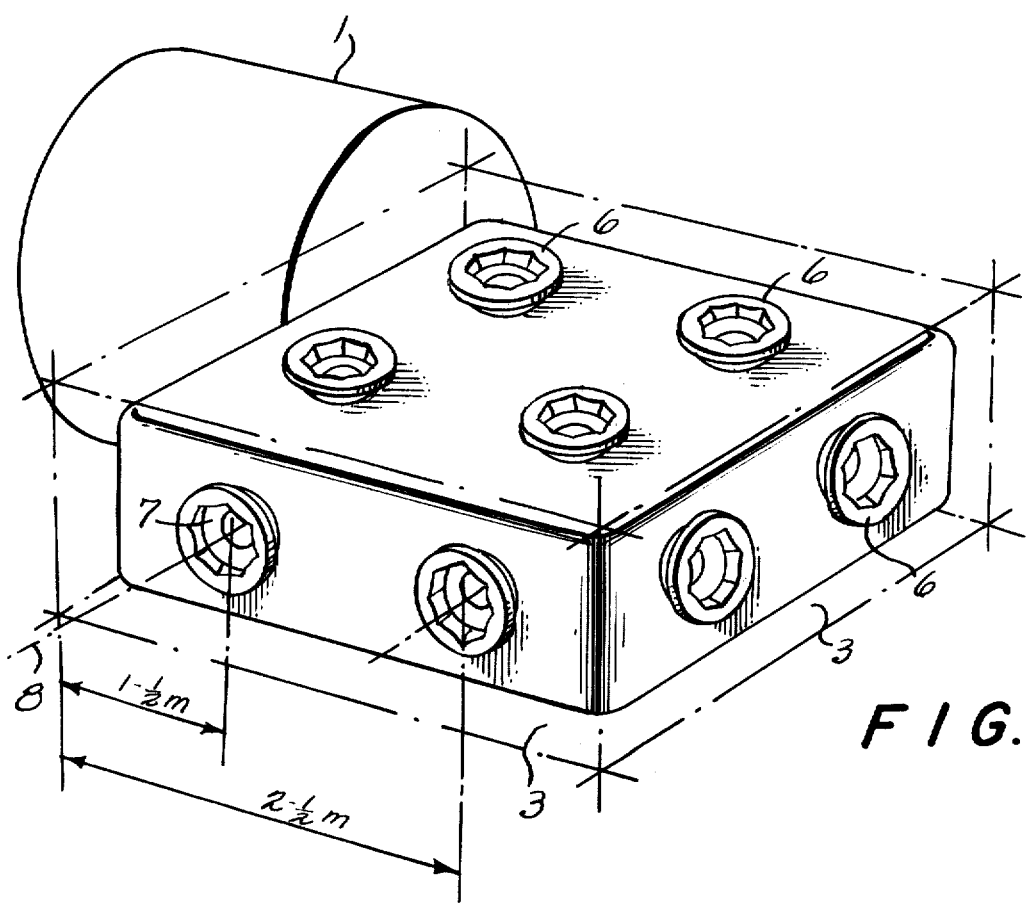
FIG. 2 shows, by way of example, a module with the load-bearing devices exposed.
Figure 3:
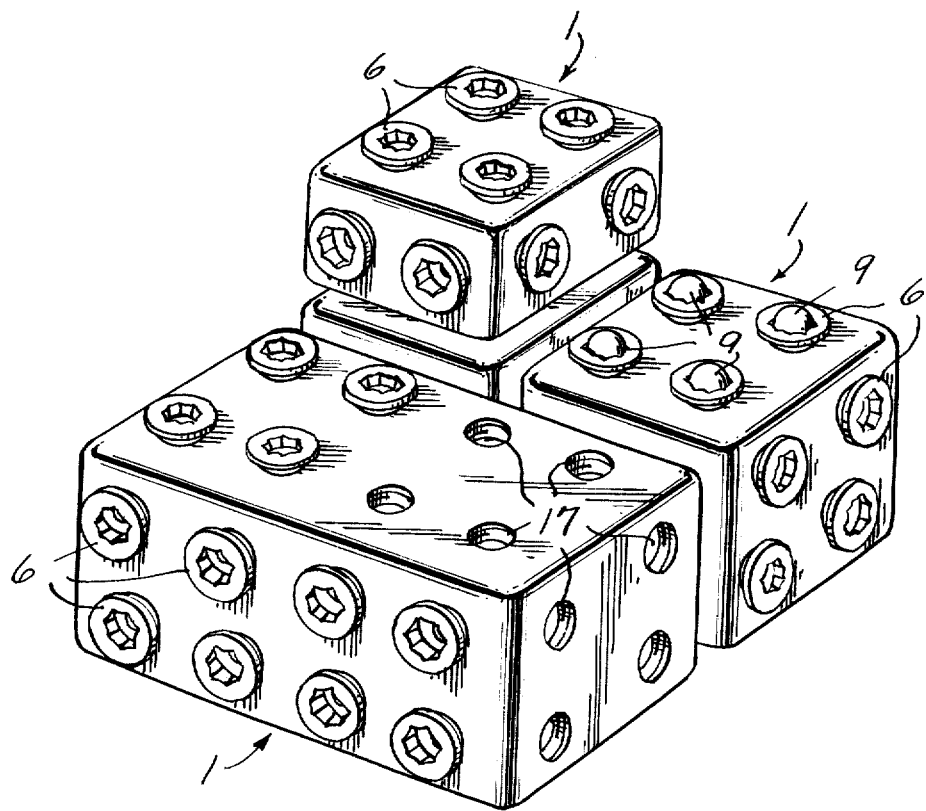
FIG. 3 shows, by way of example, four assembled modules of parallel-epipedic design.

The modules 1 comprise load-bearing devices 6. These can be seen in FIG. 2 and FIG. 3 but are shown most clearly in FIG. 4. Every load-bearing device has a conical abutment face 7 with a centre axis 8 located at right angles to the parting plane. The position of the centre axis 8 in the system of co-ordinates 2 is defined by the fact that it intersects the parting plane at a co-ordinate point indicated by the formula $(a-\frac{1}{2}).m$, $(b-\frac{1}{2}).m$. The letters $a$ and $b$ signify optional integers and $m$ is the module length. The arrangement is illustrated in FIG. 2. In the axial direction the conical abutment face 7 is so located, along its centre axis as defined above that if two modules are assembled with one another a gap is brought about between the opposite conical abutment faces of the adjacent load-bearing devices. This gap is such as to permit the insertion of a position-setting spacer element 9. This spacer element is so designed as to be in contact with the opposite abutment faces 7 while in the prestressed state.

Figure 5:
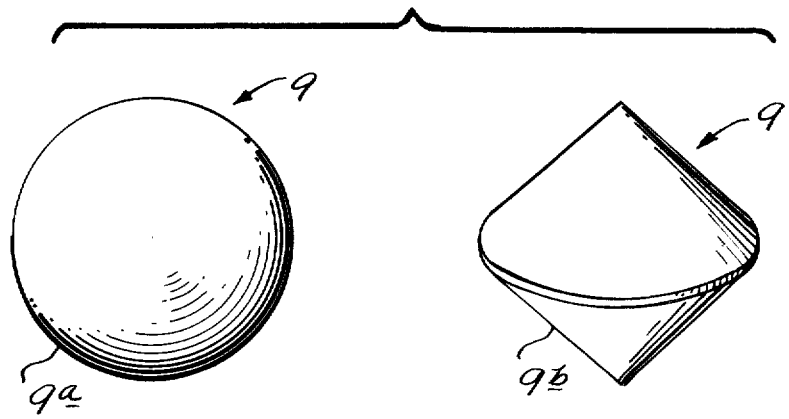
FIG. 5 shows spacer elements of two different designs intended for location between the load-bearing devices of two assembled modules.
Figure 6:
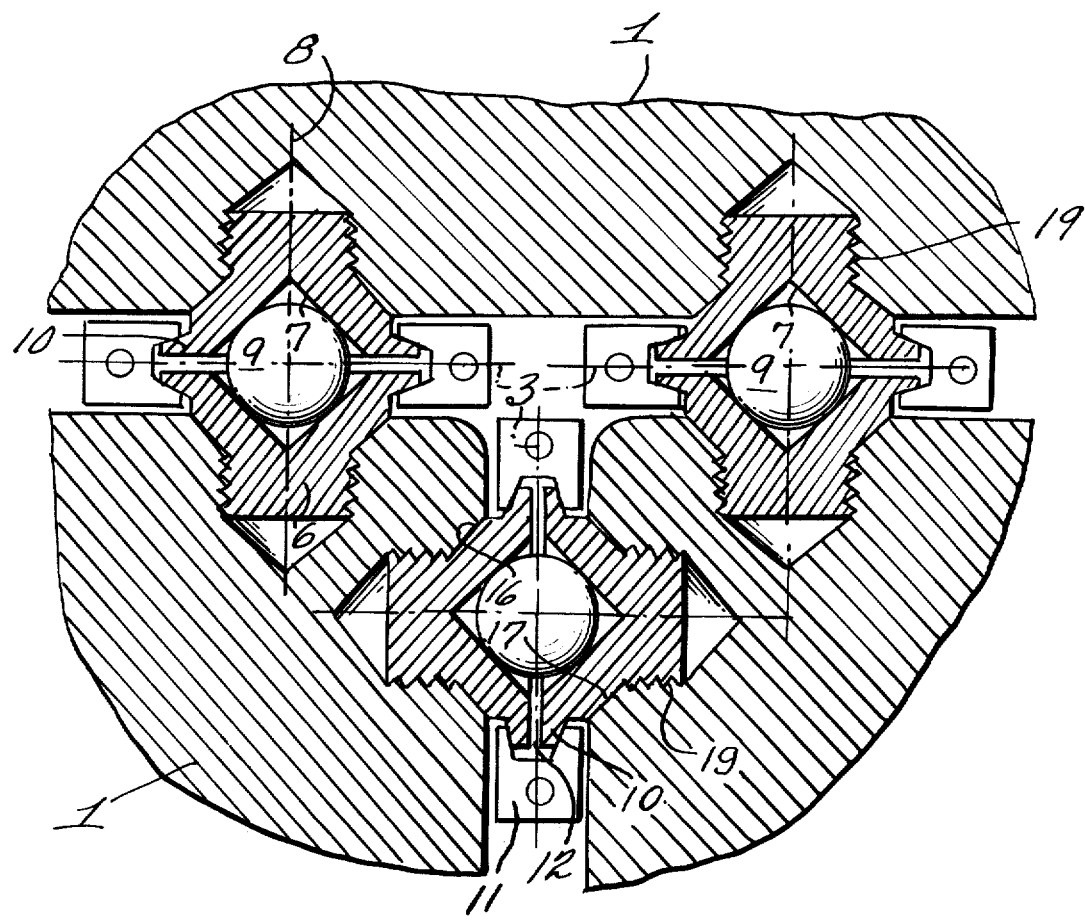
FIG. 6 is a cross-section through parts of three assembled modules showing, in addition to the load-bearing devices and space elements, how the modules are held together by prestressing clamping arrangements.

As shown in FIG. 5 the spacer elements 9 may consist of a spherical ball 9a. They can also be designed as a twin-coned body 9b.

Figure 4:
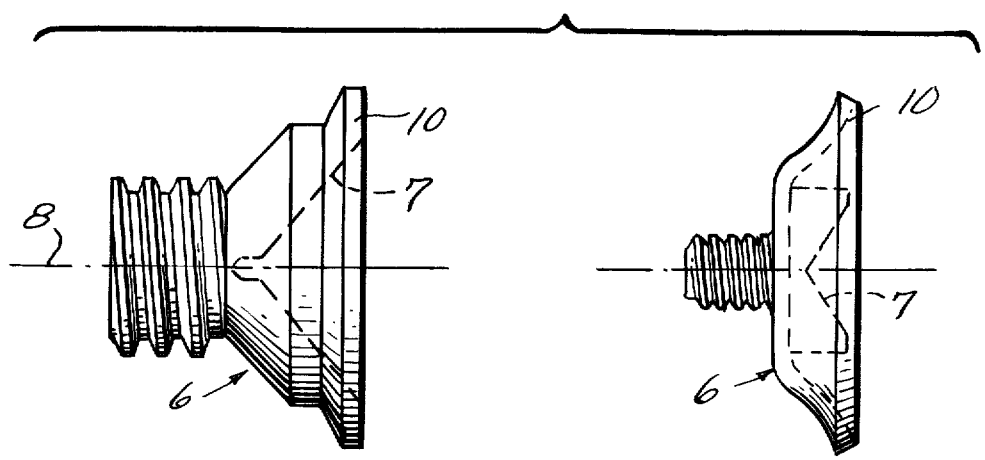
FIG. 4 is a side view of load-bearing devices of two different designs.

The load-bearing devices 6 have close to their outward-facing end a circular conical flange 10, the diameter of which increases in the direction of the parting plane. As shown in FIG. 4 this flange can be produced by e.g. turning of the same body which contains the conical abutment face 7. It can also be produced by e.g. stamping a plate which is screwed to the body with the conical abutment face.

Figure 8:
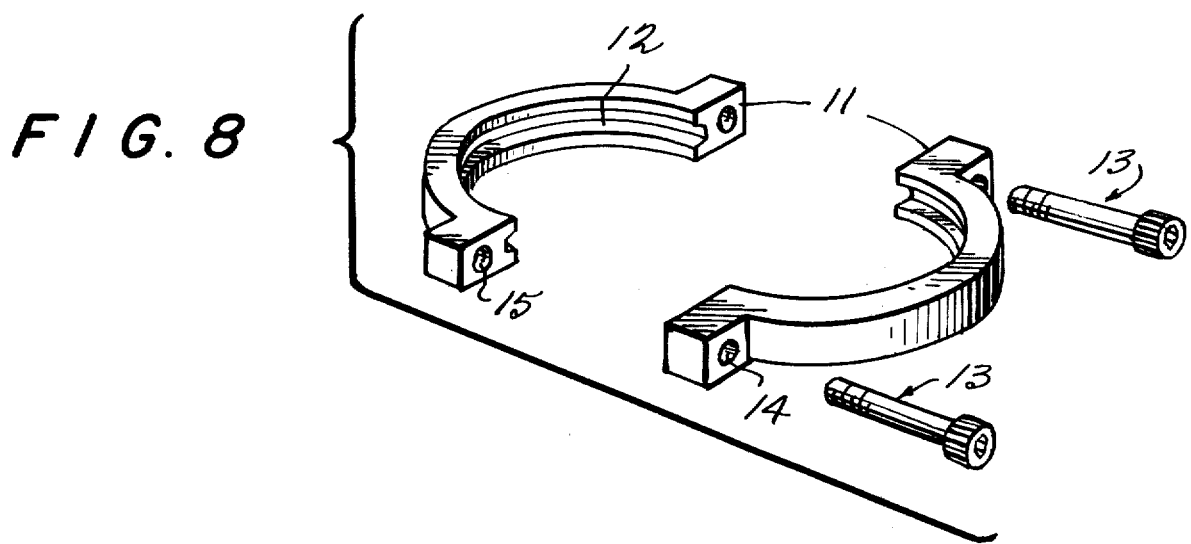
FIG. 8 shows a prestressing clamping arrangement consisting of an adjustable two-part yoke more clearly.
Figure 9:
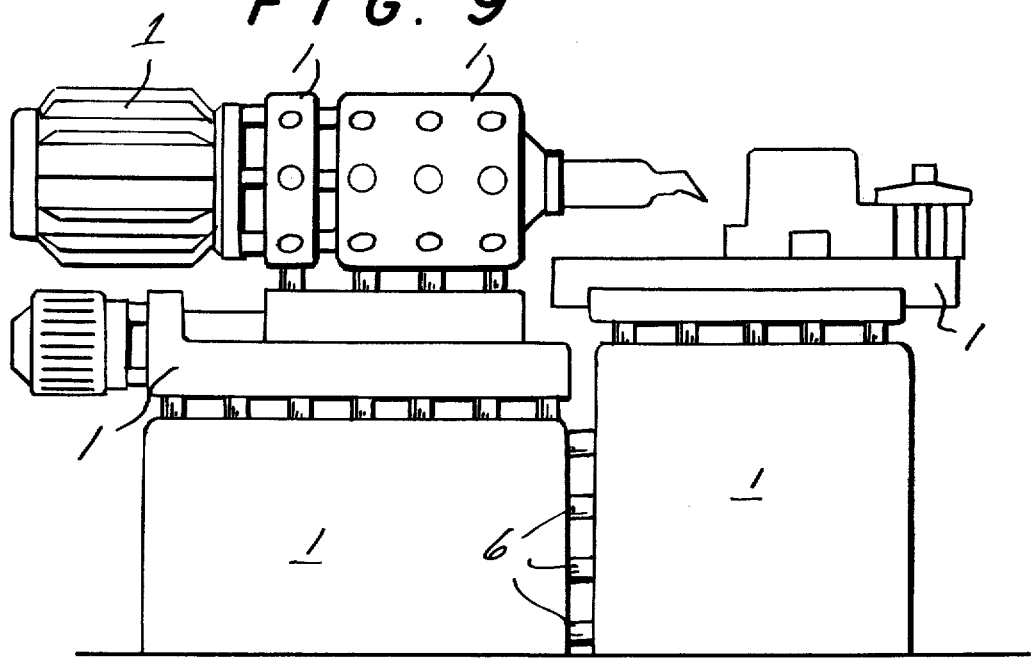
FIG. 9 illustrates, in diagrammatic form, a machine consisting of machine and base modules.

The two flanges 10 of two opposite load-bearing devices 6 are held together by a prestressing clamping arrangement 11 in the shape of a two-part yoke. This yoke comprises a groove 12 tapering in relation to its cross-section and adapted to the flanges of the two opposite load-bearing devices, FIG. 8. The two-part yoke is in turn connected by screw 13 passing through the plain hole 14 in one yoke half and drawn into the threaded hole 15 in the opposite half.

Figure 7:
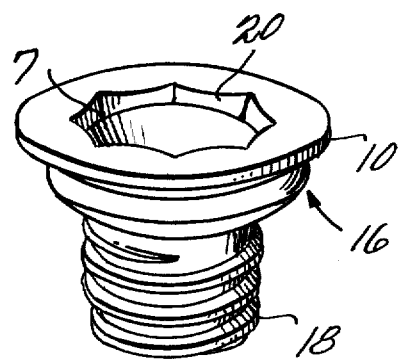
FIG. 7 shows one design of the load-bearing devices more clearly.

With the embodiment shown in FIG. 7 the load-bearing devices 6 are attached to the module to which they belong by means of a convex conical projection 16 facing coaxially inward in respect of the conically concave abutment face of each load-bearing device. This projection fits accurately into a corresponding conical cavity 17 in the module. In the embodiment shown in FIG. 7 the load-bearing devices are, in addition, provided with a thread 18 by which they can be attached to the corresponding threaded holes 19 in the remainder of the module. To enable a wrench to be applied during this securing process the load-bearing devices are also provided with a wrench retaining aperture 20 as shown in FIG. 7.

Whereas certain embodiments of the invention are described above and in the drawings it is apparent that the invention must not be regarded as being limited to these special embodiments but that it also covers any variation or modifications apparent to specialists and within the frame of the inventive idea described in the patent claims.

What is claimed is:

1. An assembly formed from two or more base modular elements having faces capable of being attached to and disconnected from one another in parting planes locatable in a cartesian, three-dimensional system of co-ordinates, the said parting planes each being parallel to two axes in the co-ordinated system and intersecting points along the third axis defined by a modular element length in the co-ordinate system, each modular element comprising a plurality of load-bearing devices by means of which the said elements are attached to one another with their faces abutting to form an integral assembly where the elements are incrementally displaceable and rotatable in discrete geometric positions, the improvement comprising said load-bearing devices each having a circular conical concave abutment face with the apex of the conical face pointing toward said respective element, the center axis of the conical face being at a right angle to the parting plane so that the position of the center axis of the conical face in the co-ordinate system is defined by the fact that it intersects the parting plane at a co-ordinate point defined by the co-ordinates: $(a-\frac{1}{2})\cdot M$; $(b-\frac{1}{2})\cdot M$; where $a$ and $b$ are integers and M is the length of the modular element, the said conical abutment face being located on the respective modular element so that when two modular elements are assembled with one another, a gap results between the opposing conical abutment faces of the adjacent elements, said gap being of a size to permit insertion of a position-setting spacer member so that said spacer member contacts the opposing conical abutment faces of the two modular elements.

2. The assembly as claimed in claim 1 wherein said conical concave abutment faces are shaped to receive spacer elements in the form of spherical balls.

3. The assembly as claimed in claim 1 wherein the apex of the conical concave abutment face has an included angle for receiving in full surface contact, one end of a twin-coned spacer member having a circular cross-section and rhombic longitudinal section.

4. The assembly as claimed in claim 1 wherein each said load-bearing device has, at its open end, a circular conical flange, the diameter of which increases in the direction of the parting plane, said flange being coaxial with said internally located conical concave abutment face.

5. The assembly as claimed in claim 4 wherein a clamping arrangement is provided and which comprises a two-part yoke diametrally adjustable by means of locking screws; said yoke being provided with a groove tapering in respect of its cross-section and adapted to engage the flanges of two opposite load-bearing devices, said yoke being designed to hold together the modular elements.

6. The assembly as claimed in claim 5 wherein the positions of the load-bearing devices in the modular element to which they belong are fixed by a convexly conically projection facing coaxially inward in respect of the conically concave abutment face in each load-bearing device, the said projection matching exactly a corresponding conical cavity in the modular element.

7. An arrangement in accordance with claim 6, characterised in that the load-bearing devices have, coaxially with the said conical faces and outside the convexly conical projection a thread matching a threaded hole in the module.

8. An arrangement in accordance with claim 7, characterised in that a polygonal internal wrench retaining aperture (20) is provided in the load-bearing devices (6) outside the circular conically concave abutment face (7).

* * * * *